US009830636B1

(12) United States Patent
Story, Jr. et al.

(10) Patent No.: US 9,830,636 B1
(45) Date of Patent: Nov. 28, 2017

(54) MULTI-FORMAT CONTENT RECOMMENDATIONS TO IMPROVE FORMAT FLUENCY

(71) Applicant: Audible, Inc., Newark, NJ (US)

(72) Inventors: Guy Ashley Story, Jr., New York, NY (US); Steven Charles Dzik, Somerset, NJ (US)

(73) Assignee: AUDIBLE, INC., Newark, NJ (US)

( * ) Notice: Subject to any disclaimer, the term of this patent is extended or adjusted under 35 U.S.C. 154(b) by 533 days.

(21) Appl. No.: 14/488,098

(22) Filed: Sep. 16, 2014

(51) Int. Cl.
*G06Q 30/00* (2012.01)
*G06Q 30/06* (2012.01)

(52) U.S. Cl.
CPC .............................. *G06Q 30/0631* (2013.01)

(58) Field of Classification Search
None
See application file for complete search history.

(56) References Cited

U.S. PATENT DOCUMENTS

| 6,953,343 | B2 * | 10/2005 | Townshend | G09B 7/04 434/178 |
| 7,882,032 | B1 | 2/2011 | Hoffman | |
| 8,700,384 | B1 * | 4/2014 | Lattyak | G06F 9/4448 704/3 |
| 8,725,565 | B1 * | 5/2014 | Ryan | G06Q 30/0269 705/14.4 |
| 8,744,855 | B1 * | 6/2014 | Rausch | G06F 17/27 235/375 |
| 9,536,438 | B2 * | 1/2017 | Sanders | G09B 5/08 |
| 2004/0260574 | A1 | 12/2004 | Gross | |
| 2005/0144133 | A1 | 6/2005 | Hoffman et al. | |
| 2007/0292826 | A1 * | 12/2007 | Goddy | G09B 19/00 434/156 |
| 2009/0254971 | A1 | 10/2009 | Herz | |
| 2009/0311657 | A1 * | 12/2009 | Dodelson | G09B 7/00 434/350 |
| 2013/0091429 | A1 | 4/2013 | Weng et al. | |
| 2013/0137518 | A1 | 5/2013 | Lucas | |
| 2013/0196292 | A1 | 8/2013 | Brennen | |
| 2014/0019526 | A1 | 1/2014 | Zeng | |
| 2014/0358773 | A1 | 12/2014 | Lerner | |

OTHER PUBLICATIONS

U.S. Appl. No. 14/303,540, Dynamic Skill-Based Content Recommendations, filed Jun. 12, 2014.

* cited by examiner

*Primary Examiner* — Courtney Stopp
(74) *Attorney, Agent, or Firm* — Knobbe, Martens, Olson & Bear, LLP

(57) ABSTRACT

Systems and methods are disclosed enabling recommendations of content items available in multiple formats based on an expected difficulty of a user in comprehending individual formats of the content item. For example, a user wishing to increase reading fluency may be provided with a recommendation for a multi-format content item including both an e-book and an audiobook. The recommended multi-format content item may be selected such that the e-book is expected to be somewhat difficult for the user to comprehend, and such that the audiobook is expected to be relatively less difficult for the user to comprehend. Thereafter, the user may simultaneously consume multiple formats of the recommended content item (e.g., by listening to the audiobook simultaneously to reading the e-book) in order to increase reading fluency.

23 Claims, 5 Drawing Sheets

MULTI-FORMAT CONTENT RECOMMENDATIONS TO IMPROVE FORMAT FLUENCY

BACKGROUND

Generally described, computing devices utilize a communication network, or a series of communication networks, to exchange data. Companies and organizations operate computer networks that interconnect a number of computing devices to support operations or provide services to third parties. In some instances, computing networks may be used to transmit items of digital content to users for consumption on a user's computing device. For example, a user's computing devices may visually convey items of content such as animations, electronic books, electronic periodicals, movies, television programs, multi-media content and portions thereof on an electronic screen or touchscreen. A user's computing devices may also direct audible output through headphones or speakers to convey items of audible content such as audiobooks, songs, movies, television programs, multi-media content and portions thereof.

Digital content may be utilized by users in a variety of contexts. For example, users desiring to learn a language may utilize digital content in that language to increase the user's exposure to the language, with the goal of increasing the user's fluency. In language learning applications, the difficulty of a content item (e.g., due to the specific vocabulary used or the nature of presentation of the language) can greatly affect the ability of a user to comprehend the item. However, the perceived difficulty of an item may vary between individual users. Consequently, selecting digital content of an appropriate difficulty can be challenging to users.

In addition, some content items are available to users in a variety of formats, such as in both textual and audio formats. However, a user's fluency level within a language may vary according to the format in which content is presented. For example, a native language learner may have a higher fluency with respect to spoken language than with respect to written text. Conversely, a non-native language learner may have a higher fluency with respect to written text than with respect to spoken language.

DETAILED DESCRIPTION

Figure 1:
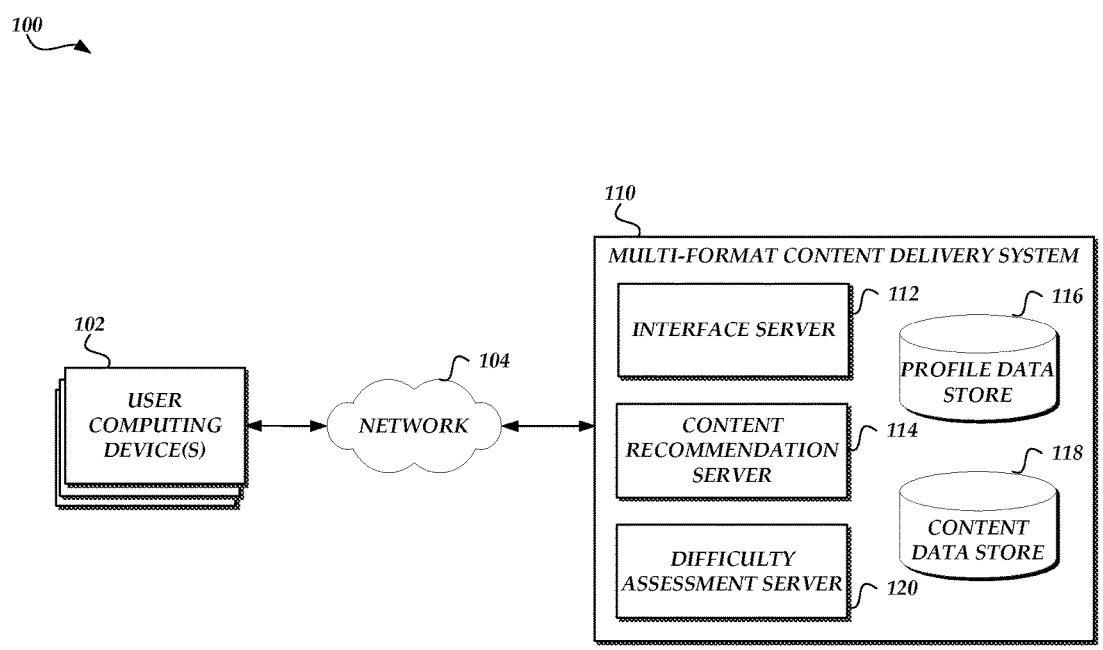
FIG. 1 is a schematic block diagram of an illustrative network environment in which a multi-format content delivery system may operate to recommend multi-format content items to users based on user skill levels.

Generally described, aspects of the present disclosure relate to the use of multi-format content items, such as a content item available in audiobook and e-book formats, to increase fluency and language comprehension in users. Specifically, multi-format content items may be recommended to users based on an expected difficulty of the user in consuming each format of the content item. For example, a recommendation for a user wishing to increase his listening fluency may include a content item available in both an e-book and audiobook format. The specific content item recommended to the user may be selected such that the text format of the content item (e.g., the e-book) is expected to be relatively easy for the user to comprehend, while the audio format of the content item (e.g., the audio book) is expected to be somewhat difficulty for the user to comprehend. Conversely, a user wishing to increase his reading fluency may be presented with a recommendation for an e-book that is expected to be somewhat challenging to read and a corresponding audiobook that is expected to be less challenging to listen to. Accordingly, embodiments of the present disclosure may utilize differences in difficulty of formats for a multi-format content item in order to recommend specific multi-format content items to a user. Illustratively, aspects of the present application may be utilized by native language learners to increase textual fluency based on existing auditory comprehension skills. Similarly, aspects of the present application may be utilized by non-native language learners to increase audio fluency based on an existing textual comprehension skills.

As used herein, fluency within a language may reflect a user's speed and accuracy in comprehending a language under various conditions. For example, a user's textual fluency within English may reflect the speed and accuracy of the user in reading English-language text. Similarly, a user's audio fluency within English may reflect the user's comprehension of English when read at a various paces, or with various accents or intonations. Accordingly, fluency may reflect any skill level within a given language, regardless of whether the user might otherwise be considered "fluent" within that language. For example, examples provided herein may describe a user who is relatively unskilled in a language as having low fluency within the language. Conversely, a user is who relatively skilled in the language may be described as having a high fluency in the language.

In general, the present disclosure may refer to a set of related content items presented within different formats as a single multi-format content item. For example, an e-book version of the novel "The Call of the Wild" may be referred to as a text-format version of that novel, while a corresponding audiobook version may be referred to as an audio-format version of that novel. However, each content version may be independently edited, produced, distributed, sold, or otherwise managed. For example, an e-book may be produced by a first party based on an automatic analysis of a source written text (e.g., a physical book, manuscript, transcript, etc.). Similarly, an audiobook may be produced by a second party based on a narration of the same source written text. Accordingly, various versions of a content item may be associated with different histories, distribution rights, production rights, etc. Based on these differences, in some instances, each version of a content item may be referred to as an individual content item in its own right. However, for brevity, content items corresponding to the same or substantively similar source material (which may in some contexts be referred to as "companion" content items) will be referred to herein as versions of a given content item. Further, where versions of a given content item are provided within multiple formats (e.g., audio, text, video, etc.), the various versions of a content item may be referred to, for brevity, as individual formats of a multi-format content item. For example, an audiobook may be referred to as an audio format of a multi-format content item, while a corresponding e-book may be referred to as a text format of the same multi-format content item. Nevertheless, as described above, each format of a given multi-format content item may represent an individual and distinct content item (e.g., an individual audiobook or e-book) within the multi-format content delivery system. Moreover, while a multi-format content item may be referred to as a combination of various formats of the content item, individual formats of a content item may be acquired, stored, or managed individually. Accordingly, reference to a combination of formats is not intended to imply that such formats must be merged, joined, or otherwise connected within the multi-format content delivery system or a user's computing device.

In order to simultaneously present multiple formats of a given content item (e.g., in both audiobook and e-book format), embodiments of the present disclosure may utilize synchronization information mapping positions within a first format of the content item (e.g., the audiobook) to corresponding positions within the second format of the content item (e.g., the e-book). Systems and methods for identifying different versions of a content item, and for producing synchronization information for such items, are described in more detail within U.S. patent application Ser. No. 13/070,313, entitled "SYNCHRONIZING DIGITAL CONTENT" and filed May 23, 2011 (hereinafter, the '313 application), which is hereby incorporated by reference. While examples provided herein may reference simultaneous playback of multiple formats of a given content item, embodiments of this disclosure may also include enabling interchangeable playback of a content item's formats. For example, embodiments of the present disclosure enable a user to consume an e-book version of a multi-format content item, halt consumption of the e-book, and later begin consumption of an audiobook from a location corresponding to that last read within the e-book. Further examples of interchangeable presentation are provided within the '313 application. Moreover, various versions of a content item may include substantive discrepancies, such that language or other content within the content item varies between versions. For example, an audiobook may include sound effects, readings, or excerpts that are excluded or only referred to within a corresponding e-book. Systems and methods for managing discrepancies within versions of a content item identifying and synchronizing different versions of a content item are described in more detail within U.S. patent application Ser. No. 13/604,482, entitled "IDENTIFYING CORRESPONDING REGIONS OF CONTENT" and filed Sep. 5, 2012, which is hereby incorporated by reference.

In order to assess the difficulty of a content item, or various formats in which the content item may be presented, the multi-format content delivery system disclosed herein may utilize either or both of implicit or explicit user feedback regarding content items (or formats thereof). The content delivery system can further utilize implicit or explicit user feedback to determine a user's skill level according to a variety of skill metrics corresponding to the difficulty metrics, each of which may represent a user's expected ability to consume content within a given format. As will be described in more detail below, multi-format content items may thereafter be recommended to users based on a user's implicit or explicit requests. For example, a user desiring to increase their listening fluency may receive a recommendation for a multi-format content item in which an audio-formatted version of the content item is expected to be somewhat difficult for the user to comprehend, while a text-formatted version of the content item is expected to be somewhat easier for the user to comprehend. In this manner, the user may utilize their existing fluency in one format (e.g., text) to rapidly increase their fluency in an alternate format (e.g., audio).

Advantageously, the disclosed multi-format content delivery system may utilize individual difficulty and skill metrics to recommend content items based on a multi-dimensional analysis of each content item format, without requiring that either the various content item formats or a user's skill with respect to each format to be placed within a one dimensional scale. Moreover, the content delivery system may utilize feedback from users to programmatically adjust difficulty metrics of content items (or formats thereof), skill metrics of users, and the process by which difficulty metrics and skill metrics are compared. Accordingly, the disclosed content delivery system can provide dynamically adjusting recommendations for multi-format content items based at least in part on a plurality of content difficulty and user skill metrics.

In one embodiment, the multi-format content delivery system determines the difficulty of a content item (or individual formats thereof), as well as the skill of users at consuming the content item (or formats thereof), based on explicit feedback from a user. For example, subsequent to consuming a content item (e.g., within a given format), a user may complete a questionnaire providing feedback regarding various metrics of difficulty of the content item or the format in which the content item was presented. Such a questionnaire may receive user feedback regarding the difficulty of a content item according to both format-independent and format-dependent difficulty metrics. Illustratively, a user consuming a text-based e-book may assess the difficulty of the e-book according to vocabulary and grammar, as well as according to the e-books use of spelling variations, layout or typesetting. Similarly, a user consuming an audiobook may assess the difficulty of audiobook according to vocabulary and grammar, as well as according to the clarity, prosody, or intonation of the narration. As discussed in more detail below, explicit feedback received from the user can then be used by the multi-format content delivery system to determine a user's skill levels, the difficulty level of the content or formats of the content, or the algorithm by which content items are recommended to users.

In another embodiment, the content delivery system can utilize implicit feedback of users in determining the difficulty level of given formats of a content item, or the skill level of the user in consuming such formats. Specifically, users of the content delivery system may utilize a computing device to consume digital content items within a variety of formats, either simultaneously (e.g., via simultaneous audiobook and e-book playback) or independently. Further, users may authorize such computing devices to monitor limited portions of their interactions with the content items to assess either or both of the user's skill level with respect to formats of content items and the difficulty of the content item (or formats thereof). As an illustrative example, assume that a user utilizes their computing device to consume an e-book, representing a text format of "The Call of the Wild." During consumption, the computing device may monitor various aspects of the user's reading, such as a speed at which the user consumes the content (e.g., based on page turns), the total duration spent reading the book, the length of reading sessions, the frequency at which portions of the e-book are re-read or repeated, the portions of the e-book highlighted, bookmarked or otherwise flagged by the user, the words for which definitions are viewed, the frequency of definition views, whether the user completes the e-book, or whether the user recommends the e-book to other users (e.g., via a rating, review or recommendation of the e-book on the multi-format content delivery system or another connected system, such as a social networking system). Thereafter, the computing device can, with consent of the user, transmit monitored consumption information to the content delivery system for analysis. As will be described in more detail below, monitored consumption information can thereafter be used by the content delivery system to determine skill metrics of the user (including format-specific skill metrics), as well as difficulty metrics of the e-book (including format-specific difficulty metrics). Still further, the content delivery system can utilize the consumption information to alter an algorithm by which multi-format content is recommended to users. Because each interaction of a user with the multi-format content delivery can serve to modify future recommendations of multi-format content items to both the individual user and to other users, the multi-format content delivery system can be viewed as a dynamically adjusting content recommendation system.

The presently disclosed multi-format content delivery presents advantages over existing systems that assign a single, fixed difficulty level to a content item. Such systems frequently combine a variety of metrics into a single difficulty scale. However, such scales fail to recognize the wide variety in various skill metrics among users, and the format-specific nature of such skill metrics. For example, a first user may have a relatively strong skill in understanding spoken language, but lack the ability to readily recognize and comprehend text. In contrast, a second user may have already established a strong reading ability, but lack listening skills. In some instances, variations in skills may be influenced by the background of a user. For example, French-language users attempting to learn English may possess a relatively strong reading ability due to the shared alphabet and lingual roots of the languages. However, the same users may have relatively weak listening skills due to substantial differences in pronunciation. In contrast, Chinese-language users attempting to learn English may have relative difficulty in reading English text (e.g., due to differences in the writing styles of the languages). Single-metric difficulty scales are unable to compensate for this variety of skill metrics among users, and difficulty levels among formats of a content item. Therefore, such systems are often prone to providing inaccurate recommendations.

Still further, the fixed nature of many established difficulty metrics often leads to inaccurate difficulty assessments of content items. Specifically, existing difficulty grading systems can utilize a variety of fixed aspects of a content item, such as words per sentence or vocabulary used, to assign a difficulty level to the content item. Such systems may also utilize individual assessments of the content item, such as assessments by experts or test groups. However, these systems generally do not enable the difficulty of a content item to be subsequently adjusted based on implicit or explicit feedback of users. Therefore, the dynamic, multi-dimensional capabilities of the presently disclosed content delivery system can enable increased accuracy in recommending content items to users over existing recommendation systems.

With reference to FIG. 1, an illustrative operating environment 100 is shown which enables users, via user computing devices 102, to receive recommendations for multi-format content items according to the expected difficulty of the content item (or formats thereof), and to browse for, acquire access rights to, and receive recommended content items from a multi-format content delivery system 110. As will be described in more detail below, the multi-format content delivery system 110 can be configured to utilize implicit and explicit feedback, exclusively or in addition to other metrics, to assess difficulty metrics of content item within various formats as well as skill metrics of users in consuming such formats. Further, the multi-format content delivery system 110 can be configured to recommend multi-format content items to users based on an expected difficulty of each format, such that the user is enabled to improve their fluency in a given format. Thereafter, users, utilizing the user computing devices 102, may acquire recommended multi-format content items from the multi-format content delivery system 110 for simultaneous consumption in multiple formats (e.g., based on simultaneous audiobook and e-book playback). Further, users may provide feedback regarding the recommended content item or individual formats of the content item, which may be utilized to dynamically adjust future recommendations generated by the multi-format content delivery system 110.

A user computing device 102 can correspond to any device utilized by a user to interact with the multi-format content delivery system 110 (e.g., to browse for, acquire rights to, or receive content items). Such user computing devices 102 include, but are not limited to, laptops, personal computers, tablet computers, personal digital assistants (PDAs), hybrid PDA/mobile phones, mobile phones, electronic book readers, digital media players, integrated components for inclusion in computing devices, appliances, electronic devices for inclusion in vehicles or machinery, gaming devices, set top boxes, electronic devices for inclusion in televisions, and the like. These user computing devices 102 may be associated with any of a number of visual, tactile, or auditory output devices, and may be associated with a number of devices for user input, including, but not limited to, keyboards, mice, trackballs, trackpads, joysticks, input tablets, trackpoints, touch screens, remote controls, game controllers, motion detectors and the like. In some embodiments, multiple user computing devices 102 may be utilized in conjunction to facilitate playback of multi-format content items. For example, a first user computing devices 102 (e.g., a personal audio player) may be configured to output a first format of a content item (e.g., an audiobook), while a second user computing device 102 (e.g., an e-reader) outputs a second format of the content item (e.g., a corresponding e-book). As a further example, first user computing devices 102 (e.g., a smartphone) may represent an input enabling user control of playback on a second user computing devices 102 (e.g., a television). Accordingly, reference to a user computing devices 102 within the present disclosure may include multiple computing devices working in conjunction to facilitate playback of a dynamic content item.

The user computing devices 102 may communicate with the multi-format content delivery system 110 via a network 104. The network 104 may be any wired network, wireless network or combination thereof. In addition, the network 104 may be a personal area network, local area network, wide area network, cable network, satellite network, cellular telephone network or combination thereof. In the illustrated embodiment, the network 104 is the Internet. Protocols and components for communicating via the Internet or any of the other aforementioned types of communication networks are well known to those skilled in the art of computer communications and thus, need not be described in more detail herein.

The multi-format content delivery system 110 is illustrated in FIG. 1 as operating in a distributed computing environment comprising several computer systems that are interconnected using one or more networks. More specifically, the multi-format content delivery system 110 includes an interface server 112, a content recommendation server 114, a profile data store 116, a content data store 118 and a difficulty ranking server 120 discussed in greater detail below. However, it may be appreciated by those skilled in the art that the multi-format content delivery system 110 may have fewer or greater components than are illustrated in FIG. 1. In addition, the multi-format content delivery system 110 could include various Web services and/or peer-to-peer network configurations. Thus, the depiction of the multi-format content delivery system 110 in FIG. 1 should be taken as illustrative and not limiting to the present disclosure.

Any one or more of the interface server 112, the content recommendation server 114, the profile data store 116, the content data store 118, and the difficulty assessment server 120 may be embodied in a plurality of components, each executing an instance of the respective interface server 112, content recommendation server 114, profile data store 116, content data store 118 and difficulty assessment server 120. A server or other computing component implementing any one of the interface server 112, the content recommendation server 114, the profile data store 116, the content data store 118, and the difficulty assessment server 120 may include a network interface, memory, processing unit, and computer readable medium drive, all of which may communicate which each other may way of a communication bus. The network interface may provide connectivity over the network 104 and/or other networks or computer systems. The processing unit may communicate to and from memory containing program instructions that the processing unit executes in order to operate the respective interface server 112, content recommendation server 114, profile data store 116, content data store 118 and difficulty assessment server 120. The memory may generally include RAM, ROM, other persistent and auxiliary memory and/or any non-transitory computer-readable media.

With further reference to FIG. 1, illustrative components of the multi-format content delivery system 110 will now be discussed. The interface server 112 can facilitate browsing and acquisition by customers of various formats of content items, such as audio books, e-books, or videos, available from the multi-format content delivery system 110. Accordingly, the interface server may provide to the user computing devices 102 information regarding multi-format content items available from the multi-format content delivery system 110. In one embodiment, information regarding multi-format content items may be provided via web pages. In another embodiment, information regarding multi-format content items may be provided via specialized applications executing on the user computing devices 102, such as a mobile-device application provided by the multi-format content delivery system 110. One illustrative example of a detail page providing information regarding a multi-format content item will be discussed below with reference to FIG. 4. In addition, the interface server 112 may enable user computing devices 102 to maintain profile information within the multi-format content delivery system 110, including payment information, user preferences, information regards access rights to acquire content items, skill-assessments, feedback regarding content items, etc. User profile information can be stored within the profile data store 116, which may correspond to any non-volatile data storage device, such as a network access storage device or a database. The interface server 112 may further enable users, using the user computing devices 102, to request and receive recommendations for multi-format content items available for acquisition from the multi-format content delivery system 110, as will be discussed in more detail below.

The multi-format content delivery system 110 can further include a content recommendation server 114 configured to generate and provide to the user computing devices 102 recommendations regarding multi-format content items available from the multi-format content delivery system 110. As will be described below, the content recommendation server 114 may utilize skill metrics for a specific user (e.g., corresponding to the user's fluency in various formats), as well as difficulty metrics of formats of a content item available from the multi-format content delivery system 110, to select a multi-format content item to recommend to a user. Skill metrics of a user may be stored, for example, within the profile data store 116. Illustratively, skill metrics may be based at least in part on explicit information provided by the user (e.g., a self-ranking, a score on an administered evaluation, etc.), on implicit information of the user (e.g., based on previous consumption of content items within a format), or a combination thereof. In addition to skill and difficulty metrics, the content recommendation server 114 may utilize a variety of different recommendation mechanisms to select content items to recommend to a user (e.g., user preferences, previous browsing or acquisition history, etc.). Various additional recommendation mechanisms are well known within the art, and therefore will be not discussed in more detail herein.

The multi-format content delivery system 110 of FIG. 1 further includes a difficulty assessment server 120 configured to assess difficulty metrics of various formats of a content item as well as skill metrics of users in consuming such formats. Specifically, the difficulty assessment server can utilize information regarding a specific format of a content item, such as characteristics of the formatted content item or feedback of users regarding the formatted content item, to assign a set of difficulty metrics to the specific format of the content item (e.g., to the specific e-book). Examples of difficulty metrics may include both format-independent difficulty metrics (e.g., the level and variety of vocabulary used by a content item, the average number of words per sentence within the content item, the average number of syllables per word within the content item, and the average difficulty rating of the content item by users of the multi-format content delivery system 110) and format-dependent difficulty metrics (e.g., the spelling variations, typesetting, or layout used within textual content; the prosody, speed, clarity, or accent of an audiobook). Determination of difficulty metrics for a given format of a content item will be described in more detail below.

The difficulty assessment server 120 can further utilize information regarding individual users of the multi-format content delivery system 110 to determine a set of skill metrics for the user (e.g., representing the user's expected fluency within various formats of a content item). Examples of skill metrics can include, for example, a speed at which the user consumes a given format of a content (e.g., based on page turns over time, a playback speed setting, etc.), the total duration spent reading, listening, or otherwise consuming a given format of a content item, the length of consumption sessions, the frequency at which portions of the content item are repeated, the words for which definitions are viewed, the frequency of definition views, whether the user completes the format of the content item, or whether the user recommends the content item to other users (e.g., via a rating, review or recommendation of the content item on the multi-format content delivery system 110 or another connected system, such as a social networking system). Determination of skill metrics for a user of the multi-format content delivery system 110 will be described in more detail below.

While depicted within FIG. 1 as a single system, the multi-format content delivery system 110 may encompass a variety of disparate systems in communication with one another via a network, such as the network 104. Illustratively, one or both of the content recommendation server 114 and the difficulty assessment server 120 may be operated by a first entity, and provide recommendations regarding content items provided by a second entity. Such a second entity may include, for example, a network-accessible merchant offering content items to the user computing devices 102 for acquisition. In some instances, the content recommendation server 114 and the difficulty assessment server 120 may operate independently from such a network-accessible merchant. Accordingly, the illustrative environment 100 of FIG. 1 is intended to be illustrative, and not limiting, in nature.

Figure 2:
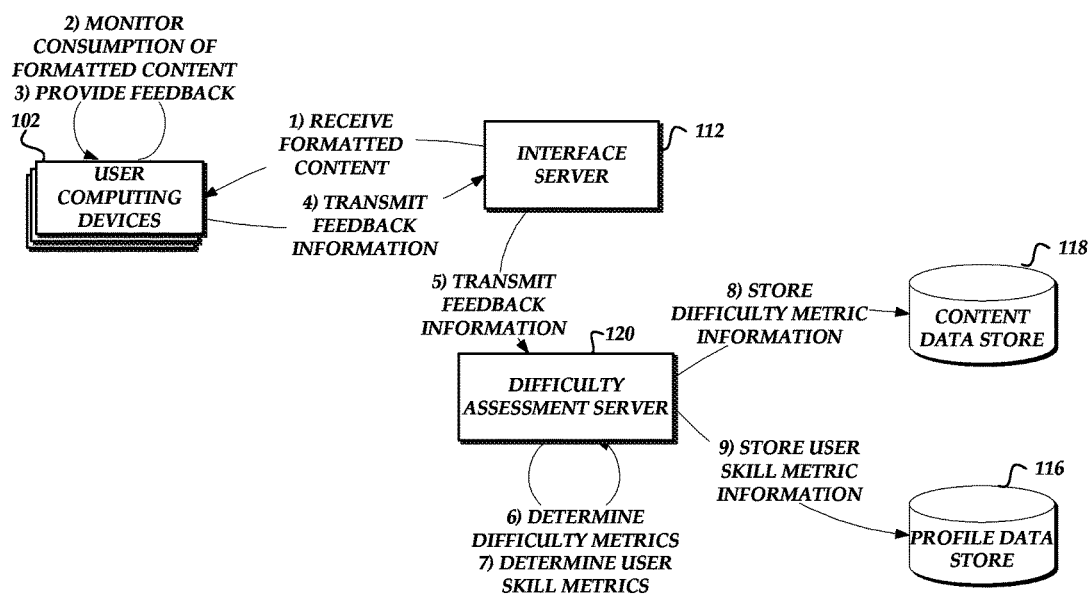
FIG. 2 is a block diagram depicting an illustrative interaction of user computing devices with the multi-format content delivery system of FIG. 1 to assess difficulties of digital content items, or versions of such content items corresponding to a variety of formats, and to assess fluency skills of users in consuming the content items (or formats thereof)

With reference to FIG. 2, one illustrative interaction for determining difficulty metrics for formats of a content item, or for the content item itself (e.g., independent of the specific format), as well as for determining skill metrics of users of the multi-format content delivery system 110 of FIG. 1 will be described. As shown in FIG. 2, the interactions begin at (1), where a plurality of user computing devices 102 receive formatted digital content items from the multi-format content delivery system 110 via the interface server 112. Such formatted content items may include multi-format content items (e.g., combinations of an e-book and corresponding audio book received separately or in conjunction), as well as individual formats of a given content item (e.g., independently transmitted e-books, audiobooks, etc.). For example, formats of an item of digital content may include audiobooks, e-books, electronic magazines or articles, short-format audio programs, television programs, or movies. Illustratively, formatted content items may be delivered to the user computing devices 102 subsequent to acquisition of the formatted content items by users of the multi-format content delivery system 110. In one embodiment, reception of a formatted content item may include transmission of a complete content item version to a user computing device 102. In another embodiment, reception may include transmission of only a portion of the formatted content item to the user computing device 102 (e.g., during on-demand playback or "streaming" of the formatted content item).

Subsequently, at (2), the user computing device 102 can monitor, with the user's consent, the user's consumption of the formatted content item. Monitored aspects may include, by way of non-limiting example, a speed at which the user consumes the formatted content item (e.g., based on page turns over time, speed or playback, etc.), the total duration spent reading consuming the formatted content item, the length of consumption session, the frequency at which portions of the formatted content item are repeated, the words for which definitions are viewed, the frequency of definition views, whether the user completes the formatted content item, or whether the user recommends the content item to other users (e.g., via a rating, review or recommendation of the content item on the multi-format content delivery system 110 or another connected system, such as a social networking system). In addition, at (3), a user computing device 102 may collect feedback from a user regarding a consumed format of a content item. Examples of feedback may include, for example, a rating or review of the formatted content item, an indication of the difficulty of the formatted content item to the user, or the results of an assessment taken by the user via the user computing device 102 (e.g., a quiz or questionnaire designed to measure fluency based on consumption of the formatted content item). While shown sequentially within FIG. 2, interactions (2) and (3) may occur in any order. In some embodiments, either explicit or implicit feedback from the use may be used exclusively. Accordingly, the interactions (2) and (3) are not mutually required to occur with FIG. 2.

Thereafter, the gathered feedback (e.g., as implicitly gathered via monitoring or explicitly provided by a user) is transmitted to the interface server 112 at (4). The interface server 112 then provides the feedback information to the difficulty assessment server 120, at (5). In some embodiments, prior to transmission to the difficulty assessment server 120, the interface server 112 may supplement the feedback information with additional data regarding the content items or users reflected within the feedback information. For example, the interface server 112 may include within the feedback information profile data of the users, such as user locations, ages, genders, languages spoken, primary languages, countries of residence, or previously determined skill metrics.

Thereafter, at (6), the difficulty assessment server 120 can utilize the feedback information, alone or in conjunction with additional information, to determine difficulty metrics for content items reflected within the feedback information, or for individual formats of a content item reflected within the feedback information. In one embodiment, the difficulty assessment server 120 may assign an initial set of difficulty metrics to a content item, or to a format of the content item, based on inherent characteristics of the content item or format, such as vocabulary used, length, words per sentence or syllables per word of the content item. Thereafter, the difficulty assessment server 120 may modify the initial difficulty metrics based on the received feedback information. For example, where a given format of a content item is initially assigned a low-vocabulary difficulty, but users have frequently conducted dictionary look-up operations for words within the formatted content item, the vocabulary difficulty of the content item can be increased. In some embodiments, feedback of users may be averaged, such that a vocabulary difficulty metric of a content item (or specific format of the content item) can be assessed with respect to the average dictionary look-up actions performed by users. In other embodiments, feedback may be averaged based on deviation from an expected value. For example, a content item with a specific initial vocabulary difficulty may be expected to require a defined number of dictionary look up operations based on a vocabulary skill of the user. Accordingly, a user's deviation from that defined number may be utilized in modifying the difficulty of a text. Illustratively, assume a user, based on a previously assessed skill, is expected to perform three dictionary look-up actions per hundred pages of an e-book, but actually performs five dictionary look-up actions per hundred pages. In such an instance, it may be expected that the initial vocabulary difficulty was too low. Therefore, the difficulty assessment server 120 can be configured to increase the vocabulary difficulty of the e-book. Conversely, where users generally comprehend a given format of a content item at a higher than expected rate, difficulty metrics corresponding to the assessed comprehension can be decreased. In some embodiments, relationships between a user's feedback and a corresponding difficulty metric may be manually defined (e.g., by an operator of the multi-format content delivery system 110). For example, frequency of vocabulary lookup operations may be manually correlated to a content item's vocabulary difficulty metric. In other embodiments, a user's feedback may be correlated to one or more difficulty metrics based on contextual analysis of feedback information. For example, where a user is asked to rate the overall difficulty of a given format of a content item, the effect of the user's rating on specific difficulty metrics may be determined based at least in part on the context of the rating. Illustratively, a user who rates a given format of a content item as very difficult shortly after performing a number of vocabulary lookups may result in an increased vocabulary difficulty metric for the format of the content item. As a further illustration, a user who rates a format of a content item as difficult after repeating multiple sections of the formatted content item may result in an increased text complexity difficulty metric for the specific format of the content item. Accordingly, relatively generic feedback information may be utilized to modify specific difficulty metrics based on contextual analysis of the user's feedback.

In some instances, difficulty metrics for individual formats of a content item may be determined independently. For example, difficulty metrics of an e-book may be determined independently from difficulty metrics for a corresponding audiobook. In other embodiments, difficulty metrics determined based on a first format of a content item may be utilized to establish or modify difficulty metrics of a second format of the content item. For example, where user's reading a given e-book frequently perform more than an expected number of vocabulary look-up actions (e.g., resulting in an increase in a vocabulary difficulty metric for the e-book), a vocabulary difficulty metric of a corresponding audiobook may also be increased. In still more embodiments, difficulty metrics may be combined for multiple formats of a content item. For example, a set of format-independent difficulty metrics (e.g., sentence complexity, vocabulary, grammar, etc.) may be utilized to establish a base-difficulty of a content item, while format-dependent difficulty metrics may modify the difficulty of various formats of the content item.

In some embodiments, difficulty metrics of a content item can further be based on analysis of similar content items. For example, where three content items of an author are assessed as having a relatively high sentence complexity, a fourth content item by the author might also be expected to have a high sentence complexity. As a further example, where audiobooks with a given narrator are frequently assessed as having relatively low format-dependent difficulty metrics, additional audiobooks narrated by the given narrator may be expected to have lower than expected format-dependent difficulty metrics. Accordingly, an initial difficulty metric assigned by the difficulty assessment server 120 may be modified to more closely conform to other content items by the same author or narrated by the same narrator. Though authorship and narration are used as illustrative examples, similar content items may be determined based on a variety of parameters, such as genre, category, subcategory, subject matter, publisher, or editor of the content item. Similar content items can further be determined by user interaction with the content item (e.g., two content items may be considered similar where users frequently consume both content items).

In addition, at (7), the difficulty assessment server 120 can determine skill metrics for individual users based on the received feedback information. As noted above, user feedback can include information corresponding to one or more skill metrics. For example, feedback may include information regarding a user's assessed proficiency (e.g., a user's reported scores on standardized language assessment tests, such as the Test of English for International Communication (TOEIC), the Test of English as a Foreign Language (TOEFL), the EIKEN Test in Practical English Proficiency, etc.), frequency of dictionary look-up actions, how often content within a given format is re-read or re-consumed by the user, the average time spent consuming content within a given format, the average speed of consumption within a given format (e.g., speed of audio playback, number of words, sentences, paragraphs, or pages consumed per unit of time, etc.), whether a content within a given format was completed, or whether the content item was shared with other users. As described with respect to difficulty metrics of a content item, each skill metric may be determined based on average feedback of the user over multiple consumption sessions or content within a given format. For example, the reading speed of a user can be determined as an average words-per-minute consumption rate over multiple reading sessions. Still further, each skill metric may be determined based on a deviation from an expected value, based at least in part on a difficulty level of the content. For example, a given e-book may have an expected reading time that varies based on a skill metric of a user. Where a user, based on a previously assessed skill level, exceeds the predicted reading rate (e.g., by a threshold amount), the user's skill metric with regard to reading speed can be increased.

While difficulty and skill metrics are described above as determined based on combinations of factors (e.g., aspects of a content item within a given format and feedback regarding the content item within the format; explicit and implicit monitor of a user's content consumption; etc.), difficulty and skill metrics may additionally or alternatively be determined based solely on individual aspects. For example, a user-perception difficulty metric for a content item within a given format may be assigned based purely on user's explicit feedback regarding a format of the content item (e.g., as averaged across users or weighted according to a user's skill metrics). Therefore, the difficulty and skill metric assessments described above are intended to be illustrative in nature.

Subsequently, the assessed difficulty and skill metrics can be stored within the multi-format content delivery system 110 for later use. Specifically, at (8), difficulty metric information for the assessed content items is stored within the content data store 118. Similarly, at (9), skill metrics for the assessed users are stored within the profile data store 116. As will be described below, the stored skill and difficulty metrics may thereafter be used by the multi-format content delivery system 110 to provide users with dynamic, multi-dimensional recommendations for multi-format content items. For example, users wishing to increase their reading fluency may receive a recommendation for a content item in which a textual format is expected to be slightly difficult for the user, but in which an additional format (e.g., audio or visual) is expected to be less difficult for the user. In this manner, a user may utilize proficiency in one or more formats to expand comprehension and fluency in other formats.

Figure 3:
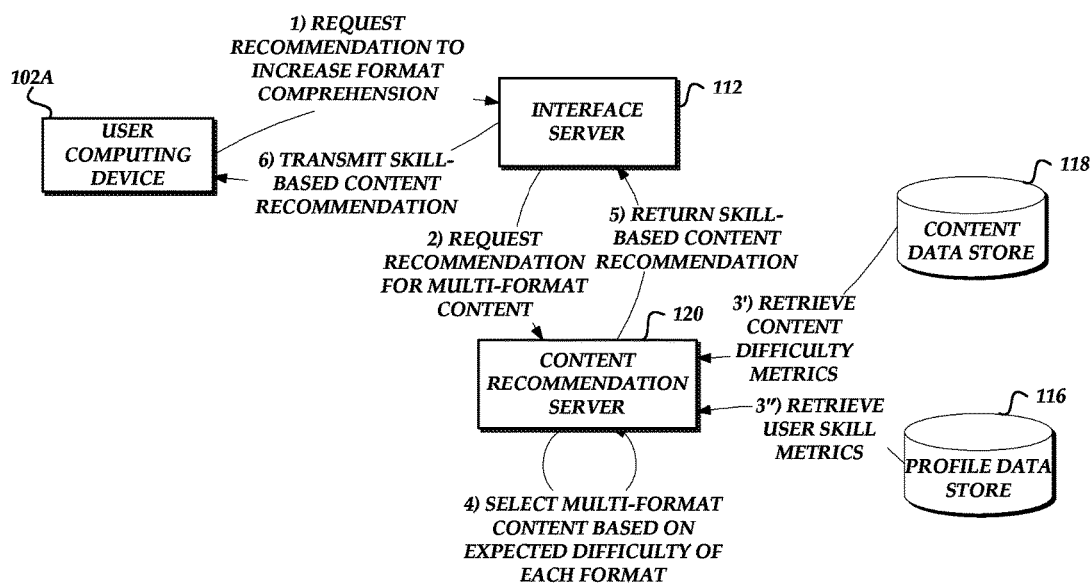
FIG. 3 is a block diagram depicting an illustrative interaction of a user computing device with the multi-format content delivery system of FIG. 1 to receive a recommendation for a multi-format digital content item based on difficulty levels of the content item in each of its multiple formats, and based on the user's fluency skill level in consuming each format.

With reference to FIG. 3, one illustrative interaction for providing a recommendation of a multi-format content item to a user of the multi-format content delivery system 110 will be described. Illustratively, the interactions of FIG. 3 may occur subsequent to a user requesting a content recommendation to increase fluency or comprehension within a given content format. Specifically, a user wishing to increase fluency in reading text may benefit from simultaneously listening to a narrated version of the text being read. Moreover, the differences in expected difficulty between multiple formats of content item may be utilized to foster development in a specific format. Illustratively, a user wishing to increase reading fluency may wish to consume a multi-format content item with a relatively easy or unchallenging listening component and a relatively difficult or challenging reading component. Similarly, user wishing to increase listening fluency may wish to consume a multi-format content item with a relatively easy or unchallenging reading component and a relatively difficult or challenging listening component. In some embodiments, similarities in expected difficulties of individual formats may also be utilized to recommend multi-format content items to a user (e.g., to provide a multi-format content item with similar difficulty levels across utilized formats).

As shown in FIG. 3, the interactions begin at (1), where a request for a recommendation to increase fluency in a specific format is transmitted from a user computing device 102A to the interface server 112. In one embodiment, the request may be transmitted based at least in part on an explicit request by a user for a content recommendation targeted to increasing fluency of a specific format (e.g., a request to increase the user's listening or reading fluency). The request may be transmitted, for example, based on user interaction with a web browser or other application (e.g., a mobile application) executing on the user computing device 102A. In another embodiment, the request may be inferred based in part on established skill metrics of the user with respect to an individual format. For example, where listening-related skill metrics of a user (e.g., skill metrics established based on consumption of audio content) are relatively low when compared to reading-related skill metrics of the user (e.g., skill metrics established based on consumption of text content), a request for a recommendation to increase listening fluency may be inferred at the multi-format content delivery system 110.

At (2), the interface server 112, in turn, requests a corresponding recommendation for a multi-format content item intended to increase fluency in a given content format from the content recommendation server 114. In some embodiments, prior to transmission to the content recommendation server 114, the interface server 112 may supplement the request with additional information regarding the requesting user. For example, the interface server 112 may include within the request profile data of the user, such as previous ratings or recommendations, prior purchase history, preferences, or interests (e.g., for specific authors, genres, categories, subject matters, etc.).

On receiving the request for a recommendation, the content recommendation server 114 can retrieve information regarding the user's skill metrics, as well as information regarding difficulty metrics of various formats of a set of available content items. Specifically, at (3'), the content recommendation server 114 can retrieve difficulty metrics from the content data store 118 for a variety of formats of potentially recommended contents. In some instances, difficulty metrics regarding all or a large portion of content items stored within the content data store 118 may be retrieved. In other instances, difficulty metrics of a specific subset of content items can be retrieved. Such a subset may be determined, for example, based on a manual selection of content items or on user preferences (e.g., for specific genres, authors, categories, etc.). In one embodiment, difficulty metrics may be retrieved for content items recommended according to other recommendation systems or mechanisms. For example, the content recommendation server 114 may implement a first, non-skill-based recommendation system configured according to a variety of known recommendation algorithms to generate an initial recommendation set, and thereafter retrieve difficulty metrics for available formats of each content item of the initial recommendation set (e.g., to generate a recommendation intended to increase fluency in a given format). Further, at (3"), the content recommendation server 114 retrieves skill metrics of the user from the profile data store 116. As noted above, the skill metrics may reflect a user's expected fluency in consuming content items (or formats thereof) based, e.g., on the historical content items and formats thereof consumed by the user, difficulty metrics of those formats of content items, a speed at which the user consumed prior content in a given format (e.g., based on page turns, words per minute, playback speed, etc.), the total duration spent consuming content item of various formats, the length of sessions consuming content items of various formats, the frequency of re-consuming portions of content items of various formats, the words for which definitions are viewed, the frequency of definition views, portions of content items highlighted or flagged by the user, whether the user completed a content item of a given difficulty, or whether the user recommended a content item to other users (e.g., via a rating, review or recommendation of the content item on the multi-format content delivery system 110 or another connected system, such as a social networking system).

After receiving difficulty metrics of various formats of potential content items and skill metrics of the user, the content recommendation server 114, at (4), generates a recommendation for a multi-format content item for the user. In one instance, the recommendation is intended to include a content item which is expected to be relatively challenging for the user when consumed in a first format (e.g., a format in which the user wishes to increase their fluency) and less challenging for the user when consumed in a second format. However, because a user's expected difficulty with respect to each format is individualized, an objective difficulty of each content format may not correspond exactly to the user's expected difficulty. For example, a multi-format content item with an objectively difficult narration may nevertheless be relatively easy for a user with high listening skills to comprehend. However, if the same user were to have relatively low reading skills, the textual difficulty of the content item for the user may be relatively high (even where the objective textual difficulty of the multi-format content item is somewhat low).

Skill metrics of a user in may be mapped to one or more difficulty metrics (e.g., either format-dependent or format-independent metrics) based on their predictive value. For example, the content recommendation server 114 may utilize machine learning techniques based on previously collected data to analyze whether a given difficulty metric and skill metric combination is predictive in determining a user's fluency in consuming a content item. Illustratively, a learning data set may be created including previously determined skill metrics and difficulty metrics for a variety of users consuming a variety of multi-format content items (or individual content items within a variety of formats). The learning data set may further include assessment metrics indicating whether the user comprehended the content item. Assessment metrics can generally correspond to content-specific skill metrics, such as whether a user completed a content item. Thereafter, machine learning techniques can be utilized to determine whether specific combinations of one or more skill metrics and one or more difficulty metrics are predictive with respect to the assessment metrics for a given user-content item pair. In some instances, assessment metrics derived from a user's interactions with a specific content format may be specifically correlated to difficulty metrics dependent on that format. For example, listening-specific assessment metrics (e.g., playback speed, length of listening sessions, evaluations conducted after consuming audio content) may be specifically correlated to audio-specific difficulty metrics (e.g., prosody, intonation, accent or speed of a narrator, clarity of an audio recording, etc.). In other embodiments, format-specific assessment metrics may be correlated to format-independent difficulty metrics. For example, reading-specific assessment metrics (e.g., frequency of page turns, frequency of rereading, dictionary look-up actions) may be correlated to difficulty metrics applicable to multiple formats, such as vocabulary or grammar complexity. Machine learning techniques are well known within the art, and therefore will not be discussed in detail herein. In some instances, machine learning to determine whether a specific combination of one or more skill metrics and one or more difficulty metrics are predictive may be conducted asynchronously to the interactions of FIG. 3. Correlations between skill metrics and difficulty metrics may further be manually defined (e.g., by an operator of the multi-format content delivery system 110). Such manually defined correlations may be utilized in addition to or exclusive of correlations determined by machine-learning techniques. Accordingly, the content recommendation server 114 may maintain a pre-determined mapping of skill and difficulty metrics, for use in generating multi-format content recommendations.

The content recommendation server 114 may utilize the received difficulty and skill metrics, as well as predicted correlations between difficulty and skill metrics, to determine an expected difficulty of the user in consuming a content item within a variety of available formats. Specifically, for each format in which a content item is available, the content recommendation server 114 can determine an expected difficulty of the user in consuming the content item within the given format based on difficulty metrics of the content item within the given format (e.g., including both difficulty metrics specific to the given format and format-independent difficulty metrics) as well as user skill metrics corresponding to the given format (e.g., as based on a user's explicit feedback, monitored interactions with other content items within the given format, or other monitored interactions indicative of the user's skill level in comprehending the given format).

Thereafter, at (4), the content recommendation server 114 can select a multi-format content item to recommend to the user based on the relative expected difficulties for each format of the content item. Specifically, the content recommendation server 114 may select a content item such that an expected difficulty in consuming the content item within a first format (e.g., as targeted by the user in order to increase fluency) is relatively higher than an expected difficulty in consuming the content item within a second available format. For example, where a user wishes to increase reading fluency, a multi-format content item may be selected such that an expected difficulty of the user in consuming a text format of the content item is relatively high, and such that an expected difficulty of the user in consuming an audio format is relatively low. Difficulty of a user in consuming individual formats of a multi-format content item may be determined based on a comparison of skill metrics of the user to corresponding difficulty metrics of the individual format of the content item. For example, a user's past consumption history of audiobooks may indicate a relatively fluency level (e.g., as indicated by a slow playback speed, high repetition of content, etc.) when consuming audiobooks with specific difficulty metrics (e.g., prosody, narration accent or intonation, sentence difficulty, etc.). This fluency level may therefore be reflected in skill metrics of the user (e.g., average playback speed, average repetition rate, etc.). Therefore, by comparing the skill metrics of the user to corresponding difficulty metrics of a potential audiobook, an estimated user-specific difficulty for the audiobook may be determined. In some instances, this user-specific difficulty may be multi-dimensional, such that specific aspects of the audiobook are expected to cause more difficulty to the user in consuming the audiobook. Similarly, the difficulty metrics associated with an alternative format (e.g., an e-book) may be utilized to determine an expected difficulty of the user in consuming that alternative format.

While various embodiments discussed above relate to selecting multi-format content items based on relative disparities in expected difficulty (e.g., such that the user's expected difficulty in one format exceeds that of a second format), some embodiments may also relate to selecting multi-format content items based on similarities of a user's expected difficulty in each format. For example, a user may desire to increase their overall fluency within a language, and therefore wish to consume a multi-format content in which each utilized format (e.g., an audiobook and corresponding e-book) represent similar difficulty levels for the user. Illustratively, selection of content with similar expected difficulties across multiple formats may improve a user's ability to interchangeable consume multiple formats of a content item (e.g., such that shifting a format in which the content item is consumed does not greatly alter the user's difficulty in consuming the content item).

Accordingly, the content recommendation server 114 may select from a set of available multi-format content items based on an expected difficulty of the available formats of that content item. Illustratively, a user learning to read in a specific language may benefit from consuming textual content items that are neither extremely easy not extremely difficult for a user. Accordingly, the content recommendation server 114 may attempt to match the skill metrics of a user to corresponding difficulty metrics of an available e-book (e.g., a text formatted version of an available content item), such that no individual difficulty metric of is too far removed from a corresponding skill metric of the user. For example, the content recommendation server 114 can attempt to correlate a vocabulary skill of the user with a content item of corresponding vocabulary difficulty. In one embodiment, the content recommendation server 114 can determine a "distance" between each skill metric of the user and corresponding difficulty metric of the specific format of the content item, and select a recommended content item within a given format such that no individual distance between a skill metric and difficulty metric pair exceeds a threshold level. In another embodiment, the content recommendation server 114 may utilize a linear algorithm to predict an overall difficulty of the content item within a given format for the individual user. For example, the content recommendation server 114 may linearly weight each distance between a user skill metric and a corresponding difficulty metric of the formatted content item to determine a personalized difficulty score. While a one-to-one correspondence between skill metrics and difficulty metrics is described above, in some embodiments, any number or combination of skill metrics may correspond to any number or combination of difficulty metrics. Therefore, correspondence between skill and difficulty metrics may be, one-to-one, one-to-many, many-to-one, many-to-many, etc.

As noted above, it may be beneficial to language learning users to utilize additional available formats of a content item to assist in developing fluency within a targeted format. Illustratively, in continuing the example above, a user wishing to increase reading fluency may benefit from being provided with a text that is somewhat difficult for the user to read, as well as an accompanying audiobook that is less difficulty for the user to read. In this manner, the user may utilize an existing fluency in a first format (e.g., audio) to assist development of fluency in a second format (e.g., text). Accordingly, the content recommendation server 114 may select a multi-format content item based on an expected difficulty of individual formats corresponding to the multi-format content item. For example, the content recommendation server 114 such that a reading difficulty is expected to be higher than a corresponding listening difficulty. In some instances, threshold difficulty levels (e.g., based on a distance between corresponding user skill and content difficulty metrics) may be established for each format of a content item. Illustratively, threshold difficulty levels for those formats targeted by a user for improvement (e.g., based on a user's explicit or implicit requests) may be set at a high level relative to threshold difficulty levels for those formats not targeted by the user for improvement. Accordingly, differences in difficulty levels for individual formats of a multi-format content item may be utilized to assist in developing a user's fluency for a specific format. Similarly, similarities in difficulty levels for individual formats of a multi-format content item may be utilized to select content items to improve a user's overall fluency in a language, or to provide content items in which a user is expected to be able to easily alter their format of consumption.

In some embodiments, the content recommendation server 114 may utilize alternative or additional parameters to determine an expected difficulty of a multi-format content item, or individually formatted versions of such a content item. For example, a language learner may be expected to perceive a content item as less difficult where the content item corresponds to preferences of the user (e.g., as being authored by a preferred author, falling within a preferred genre, etc.). Accordingly, where a content item corresponds to the preferences of a customer, the content recommendation server 114 may reduce an expected difficulty of the content item. Conversely, where a content item (or an individually formatted version of the content item) does not correspond to preferences of the user, the content recommendation server 114 may increase the expected difficulty of the content item. In another example, a language learner may be expected to perceive content as more or less difficult based on the learner's familiarity with a subject matter of the content item (e.g., as determined based on historical consumption of the language learner, explicit specification of the language learner, etc.). For example, where a user has shown a relatively high fluency in consuming content items of a particular subject matter, the expected difficulty of the user in consuming additional content of that subject matter may be lowered. Similarly, where a user has little history in consuming a content of a given subject matter, or has shown low fluency in consuming such content, the expected difficulty of the user in consuming additional content of that subject matter may be increased.

In some embodiments, the content recommendation server 114 may utilize a range of potential difficulties for a content item, or specific formats of that content item, to recommend a multi-format content item to a user. Illustratively, the user computing device 102A, the interface server 112, or other components of the multi-format content delivery system 110 (not shown in FIG. 3) may be configured to modify aspects of a multi-format content item (or individual formats thereof) in order to modify the expected difficulty of the content item to the user. Illustratively, the interface server 112 may be configured to modify the speed, prosody, accent or intonation of an audiobook in order to either increase or decrease the expected difficulty of a user in consuming the content. Systems and methods to modify aspects of an audio content item are described in more detail within U.S. patent application Ser. No. 13/465,853, filed May 7, 2012 and entitled "Content Customization," the entirety of which is hereby incorporated by reference. Similarly, for textual content, the interface server 112 may be configured to modify the layout, text size, font, or design of text in order to increase or reduce the expected difficulty to the user in consuming the content. In this manner, the expected difficulty of individual formats of a multi-format content item could be considered as a potential range. The content recommendation server 114 may therefore select a multi-format content item to recommend to a user based on a range of potential user difficulties for each format. Thereafter, the user computing device 102 or multi-format content delivery system 110 may modify individual formats of the recommended multi-format content item such that each format meets a desired difficulty of the user in consuming the content. Utilization of ranges for difficulties of individual formats of a multi-format content item may be beneficial, for example, to increase the number of multi-format content items that may be recommended to a user with widely different fluencies in various formats.

In some instances, the multi-format content delivery system 110 or the user computing device 110 may continue to modify the difficulty of a content item (or individual formats of the content item) during consumption. Illustratively, as discussed above, embodiments of the present application enable a user's skill metrics to be continuously reassessed during interaction with the multi-format content delivery system 110. Accordingly, the expected difficulty of a content item (or individual formats thereof) may alter during consumption. For example, where a user increases their apparent fluency greatly during consumption of a content item, the expected difficulty of the content item may decrease. In such instances, the multi-format content delivery system 110 may be configured to modify the difficulty of the content item (or individual formats thereof) to maintain an appropriate difficulty for the user. Illustratively, where a user displays a higher than expected fluency with respect to a first format of a content item, the expected difficulty of the format may be increased. Therefore, the multi-format content delivery system 110 may adjust the difficulty of the first format such that an updated expected difficulty again falls within a given threshold range. Similarly, where a user displays a lower than expected fluency with respect to a second format of the content item, multi-format content delivery system 110 may adjust the difficulty of the second format such that the expected difficulty also falls within the threshold range. The multi-format content delivery system 110 may therefore vary the difficulty of individual formats of a content item in order to maintain appropriate difficulty for the user in consuming each format.

After selection of a multi-format content item for recommendation (e.g., based on the expected difficulty score of individual formats of the content item), the content recommendation server 114 can then transmit the multi-format content recommendation to the interface server 112 at (5). The interface server 112, in turn, transmits the multi-format content recommendation to the user computing device 102A at (6). In one embodiment, the recommendation may be transmitted via an item detail page or other display page generated by the interface server 112. One example of an item detail page including a multi-format content recommendation will be described in more detail below with reference to FIG. 4. In another embodiment, the multi-format content recommendation is displayed within a dedicated software application executing on the user computing device 102A, such an e-book or audiobook playback software. One skilled in the art will appreciate that the recommendation may be transmitted through any communication channel established between the interface server 112 and the user computing device 102, including, for example, electronic mail, telephonic message (e.g., via short message services), or other electronic message.

Figure 4:
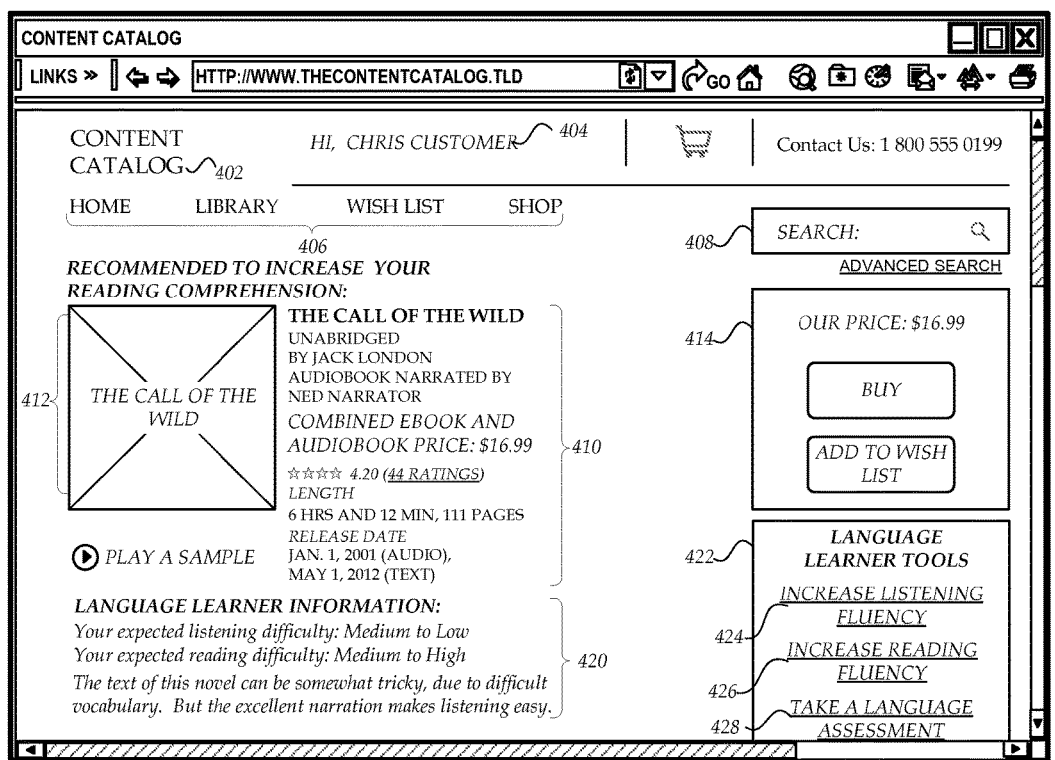
FIG. 4 depicts an illustrative user interface that may be used to provide users of the multi-format content delivery system of FIG. 1 with recommendations for multi-format content items, based on the expected difficulty of the user in consuming the multi-format content items.

With reference now to FIG. 4, one example of an illustrative user interface 400 by which a user may view a multi-format content recommendation intended to increase fluency in a specific content format, request additional recommendations for increasing fluency in specific formats, and interact with the multi-format content delivery system 110 of FIG. 1 will be described. Specifically, the user interface 400 presents information regarding a multi-format content item, including both audio and text format content, and recommended by the multi-format content delivery system 110 based on skill metrics of a user. While the user interface 400 is generally directed toward a multi-format content item including audio and text, embodiments of the present disclosure may relate to multi-format content items including additional formats, such as video content.

In one embodiment, user interface 400 is generated by interface server 112 as a result of a previous request for a multi-format content recommendation by the user (e.g., via a mobile application, browser software, etc.). As shown in FIG. 4, the user interface 400 provides information retrieved from the multi-format content delivery system 110, i.e., the "Content Catalog" 402 to "Chris Customer" 404, an illustrative user accessing the "Content Catalog" 402. Because the user is viewing details regarding a specific offered item of multi-format content, and may wish to browse to other content items, navigation links 406 are displayed. Navigation links 406 enable a user to browse and select other content available from the multi-format content delivery system 110. Similarly, display feature 408 enables a user to search the Content Catalog for additional content items. Currently, the user interface 400 depicts information for the multi-format content item "The Call of the Wild," including both an e-book and audiobook formatted content, as illustrated in display feature 410. Display feature 410 further includes additional information regarding the content item, such as the author, narrator, a purchase price for the multi-format content, a length, a release date and a number of content item reviews or ratings. In addition, the interface 400 includes a graphic or image 412 related to the content item, which may be a "cover image" of the content item.

The user interface 400 further includes content portions 420 and 422, enabling Chris Customer to receive and request multi-format content recommendations from the multi-format content delivery system 110. Specifically, content portion 420 includes an indication of the expected difficulty of the user in consuming each format of the content item. Illustratively, the expected difficulty assessment for an individual format of a content item can be determined by comparing a user's skill metrics to corresponding difficulty metrics of the individual format of the content item. As shown in FIG. 4, the expected difficulty of an audio-formatted version of "The Call of the Wild" (e.g., an audiobook) to Chris Customer is "medium to low," indicating that the user is likely to readily comprehend the audio-formatted version of the content item. As further shown in FIG. 4, the expected difficulty of a text-formatted version of the same content item to Chris Customer is "medium to high," indicating that while Chris Customer is likely to be able to understand the content item, doing so may be somewhat difficult. Accordingly, consuming the text-formatted version may be expected to assist Chris Customer in increasing his reading fluency. Moreover, consuming both the text and audio formats of the content item simultaneously may assist in comprehension of the content item (e.g., allowing texts of greater difficulty to be readily consumed and increasing the speed at which fluency is developed).

FIG. 4 further includes a brief explanation of the recommendation. Specifically, content portion 420 indicates that the user is likely to find the e-book version of the content item to be somewhat difficulty due to the vocabulary used, but that narration of the audiobook is expected to make listening less challenging to the user. Illustratively, the brief explanation within content portion 420 may be automatically generated by the multi-format content delivery system 110 based at least in part on a human-readable identification of the difficulty metric of the content item that most exceeds a corresponding skill metrics of the user.

Control portion 422 enables the user, Chris Customer, to further interact with the multi-format content delivery system 110. Specifically, portion 422 includes a first input control 424 enabling Chris Customer to request additional recommendations from the multi-format content delivery system 110 directed to increasing listening fluency. Similarly, portion 422 further includes a second input control 426 enabling Chris Customer to request additional recommendations from the multi-format content delivery system 110 directed to increasing reading fluency. Generation of multi-format content recommendations directed to increasing fluency within a particular format is discussed in more detail below with reference to FIG. 5. Accordingly, selection of input controls 424 or 426 can enable Chris Customer to transmit a request for a content based recommendation to the multi-format content delivery system 110. In addition, input control 428 enables Chris Customer to interact with the multi-format content delivery system 110 to modify his associated skill metrics. Specifically, selection of input control 428 enables Chris Customer to complete a language assessment through the multi-format content delivery system 110 designed to assess skill metrics of Chris Customer. Language assessments are common within the art, and therefore will not be described in more detail herein. One skilled in the art will appreciate that additional input controls may be provided within the content portion 422, enabling users to further interact with the multi-format content delivery system 110 (e.g., by providing feedback for consumed items, entering users preferences, etc.).

Figure 5:
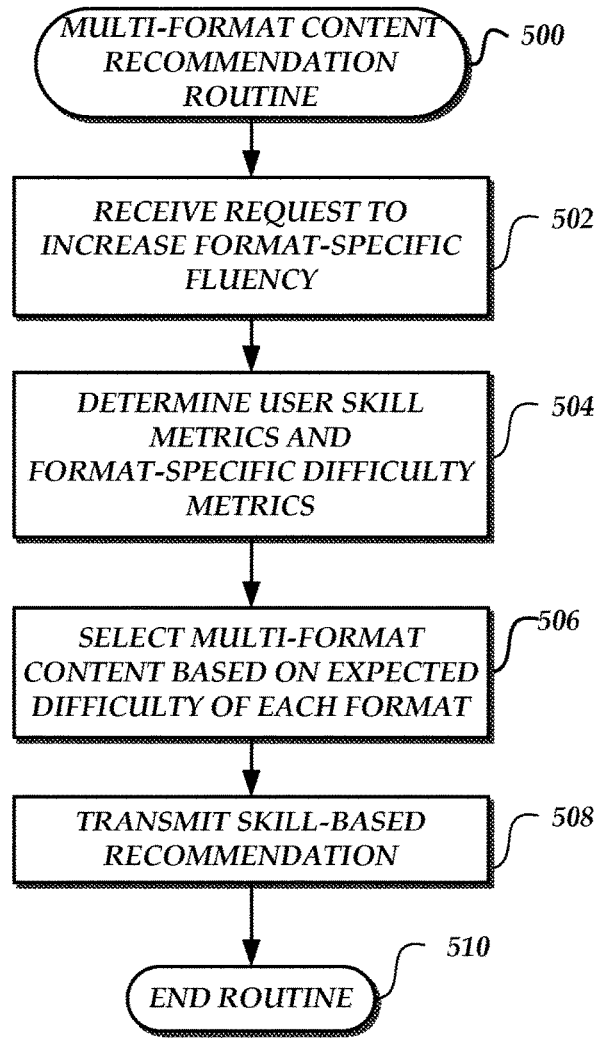
FIG. 5 is a flow diagram depicting an illustrative routine for providing content recommendations of multi-format content items based on difficulty metrics associated with each format in which the content item is presented and on a user's expected skill level for each format, as may be implemented by the multi-format content delivery system of FIG. 1.

With reference to FIG. 5, an illustrative routine 500 for generating a multi-format content recommendation to increase fluency in a targeted format will be described. The routine 500 may be carried out, for example, by the content recommendation server 114 of FIG. 1. The routine 500 begins at block 502, where a request for a recommendation to increase fluency in a targeted format is received at the content recommendation server 114. In one embodiment, the request may be received as a result of user interaction with the interface server 112 (e.g., by selecting inputs 424 or 426 of FIG. 4).

Thereafter, at block 504, the content recommendation server 114 determines user skill metrics of the user, as well as a set of difficulty metrics for individual formats of a set of multi-format content items that may be potentially recommended to the user. In one embodiment, skill metrics may be retrieved from a data store (e.g., the profile data store 116 of FIG. 1), and based on previous interactions of the user with the multi-format content delivery system 100. In another embodiment, skill metrics may be determined based on user input to the multi-format content delivery system 100. For example, where a user has not yet established skill metrics within the multi-format content delivery system 100, the content recommendation server 114 may request that the user complete an assessment of their language skills (e.g., with respect to reading, listening, etc.), or provide a self-assessment of such skills.

Similarly, at block 504, difficulty metrics for individual formats of a set of potentially recommended multi-format content items can be retrieved from a content data store, such as the content data store 118 of FIG. 1. As noted above, difficulty metrics can represent the potential difficulty of a user in comprehending a given format of a content item (or the content item itself), based on multiple difficulty dimensions. Such difficulty metrics may be format-dependent (e.g., applying to only a given format of the content item) or format-independent (e.g., applying to the content item itself, regardless of format). Difficulty metrics can be determined, for example, based on automated analysis of the content items or individual formats of the content items, based on user feedback received for formatted versions of the content items, based on difficulty metrics of other similar content items or formats of content items, or any combination thereof. In one embodiment, difficulty metrics for all format-specific versions of all possible content items are determined at the content recommendation server 114. In another embodiment, difficulty metrics are determined only for individual formats of an initial set of potential recommendation candidates, such as multi-format content items selected based on a non-skill-based content recommendations system known within the art. In still more embodiments, difficulty metrics for one or more formats of a content item may be selected based at least in part on characteristics of the user. Illustratively, language learners residing or originating in a first country of origin may perceive a given format of a content item as more (or less) difficult than similar language learners residing in or originating in a second country. Similarly, users within a first age range may perceive a given format of a content item as more (or less) difficult than similar users within a second age range. Accordingly, in some embodiments, the multi-format content delivery system 110 may maintain or generate difficulty metrics based on usage of a specific sub-set of users. For example, difficulty metrics may be generated for users of specific countries, age ranges, genders, interests, or other characteristics or demographics. In such embodiments, at block 504, the content recommendation server 114 may retrieve or determine difficult metrics generated based on feedback of users similar to a requesting user (e.g., having similar characteristics or demographics to the requesting user).

Thereafter, at block 506, the content recommendation server 114 utilizes the determined skill metrics, along with difficulty metrics for individual formats of a set of multi-format content items, to generate a recommendation for a multi-format content item to the user. Specifically, as described above, the content recommendation server 114 may select from among a set of potential multi-format content items (e.g., available for acquisition from the multi-format content distribution system 110) to determine a content item that includes a first format expected to be somewhat difficult for the user to consume and a second format that is expected to be somewhat less difficult for the user to consume. Illustratively, the somewhat more difficult format may conform to the format in which the user wishes to increase fluency. For example, a user wishing to increase listening fluency may receive a recommendation for a multi-format content item including an audiobook expected to pose some difficulty for the user and an e-book expected to be somewhat less difficulty for the user.

In order to select from a set of potential multi-format content items, the content recommendation server 114 can determine a set of relative difficulties of the user in consuming individual formats of each potential content item. As discussed above, relatively difficulty can be determined, for example, based on a distance between a skill metric of the user and a corresponding difficulty metric of given format of the content item. Illustratively, if an audiobook has a relatively high difficulty metric with regards to words spoken per minute, but a user's skill metric indicates that they generally consume content items (e.g., audiobooks, e-books, or both) at a much lower rate of words per minute, a high relative difficulty can be determined for this specific skill and difficulty metric pair. Each relative difficulty can thereafter be weighted in a linear or non-linear algorithm to determine an expected difficulty of the user in consuming the audiobook (or other specific format of a content item). The content recommendation server 114 may then utilize the expected difficulty of each analyzed format within a multi-format content item to select one or more multi-format content items to recommend to the user. For example, where a user desires to consume textual content within a specific difficulty range (e.g., selected in order to enhance fluency in the specific format), the content recommendation server 114 may select a multi-format content item including an e-book within the specific difficulty range to recommend to the user. The content recommendation server 114 may further utilize desired ranges for non-targeted formats, such that additional, non-targeted formats of a selected multi-format content item fall within a given threshold range of difficulty (which may be lower than the range of the targeted content). In some embodiments, the content recommendation server 114 may also utilize non-skill based metrics in recommending content items. For example, where more than one multi-format content items fall within desired difficulty ranges, the content recommendation server 114 may utilize subject matter, genre, author or other preferences of the user in selecting a set of recommended multi-format content items.

Thereafter, at block 508, the generated multi-format recommendation is transmitted to the user at a user computing device 102. Illustratively, the recommendation can be transmitted by use of an item display page, such as the display page 400 of FIG. 4. The routine 500 may then end at block 510.

In some instances, the routine 500 may include additional elements. For example, embodiments of the present application may enable skill metrics of a user or difficulty metrics of content items (or individual formats thereof) to be dynamically modified based on feedback of a user. As discussed above, feedback may include implicit feedback, such as actions taken by the user during or after consumption of the content item, as well as explicit feedback, such as an assessment by the user assessing comprehension of the content item or reporting difficulty experienced by the user. Additional details regarding modification of difficulty metrics for individual content items (including specifically formatted versions of a given content item) may be found within U.S. patent application Ser. No. 14/303,540, entitled "DYNAMIC SKILL-BASED CONTENT RECOMMENDATIONS" and filed Jun. 12, 2014, which is hereby incorporated by reference. Further, in some instances the routine 500 may include elements enabling the user to acquire rights to a multi-format content item (or individually formatted versions of the content item), to receive the multi-format content item (or individually formatted versions thereof), and to simultaneously playback the various formats of the content item. Details regarding the acquisition, reception, and simultaneous playback of individually formatted versions of a content item are described in more detail within the '313 application, incorporated by reference above.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to generate recommendations of content items available in multiple formats, the system comprising:
   a non-volatile data store including information regarding a set of content items, wherein each content item of the set of content items is available in a plurality of formats, and wherein the plurality of formats include at least a text format and an audio format; and
   a processor in communication with the non-volatile data store and configured with computer-executable instructions that, when executed by the processor, cause the processor to at least:
      receive a request from a user to increase fluency in a first format of the plurality of formats;
      for individual content items of the set of content items, determine an expected difficulty of the user in comprehending the individual content item in the first format and an expected difficulty of the user in comprehending the individual content item in a second format of the plurality of formats;
      select a content item from the set of content items based at least in part on the expected difficulty of the user in comprehending the selected content item in the first format and the expected difficulty of the user in comprehending the selected content item in the second format, wherein the expected difficulty of the user in comprehending the selected content item in the first format exceeds the expected difficulty of the user in comprehending the selected content item in the second format; and
      transmit a recommendation for the selected content item to the user.

2. The system of claim 1, wherein the audio format corresponds to an audiobook, and wherein the text format corresponds to an electronic book.

3. The system of claim 1, wherein the plurality of formats further includes a video format.

4. The system of claim 1, wherein the expected difficulty of the user in comprehending the selected content item in the first format is based at least in part on a set of skill metrics of the user and a set of difficulty metrics of the first format of the selected content item.

5. The system of claim 4, wherein the skill metrics of the user are determined based at least in part on a history of the user's consumption of content items in the first format.

6. The system of claim 4, wherein the difficulty metrics of the first format of the selected content item are determined based at least in part on other user's consumption of the first format of the selected content item.

7. A computer-implemented method for providing content item recommendations, the computer-implemented method comprising:
   receiving a request from a user for a recommendation of a content item;

for individual content items of a plurality of content items available in a first format and in a second format, determining an expected difficulty of the user in comprehending the individual content item in the first format and an expected difficulty of the user in comprehending the individual content item in the second format;

selecting a content item from the plurality of content items based at least in part on an expected difficulty of the user in comprehending the selected content item in the first format and an expected difficulty of the user in comprehending the selected content item in the second format; and transmitting a recommendation of the selected content item to the user.

8. The computer-implemented method of claim 7, wherein the first format corresponds to a text, audio, or video format.

9. The computer-implemented method of claim 7, wherein the expected difficulty of the user in comprehending the selected content item in the first format exceeds a first threshold difficulty level.

10. The computer-implemented method of claim 9, wherein the expected difficulty of the user in comprehending the selected content item in the second format exceeds a second threshold difficulty level.

11. The computer-implemented method of claim 9, wherein the first threshold difficulty level is higher than the second threshold difficulty level.

12. The computer-implemented method of claim 7, wherein the expected difficulty of the user in comprehending the selected content item in the first format is based at least in part on a comparison of skill metrics of the user with difficulty metrics of the first format of the selected content item.

13. The computer-implemented method of claim 12, wherein the difficulty metrics of the first format of the selected content item include at least one of vocabulary of the selected content item, an average number of words per sentence within the selected content item, an average number of syllables per word within the selected content item, an average difficulty rating of the first format of the selected content item by other users, spelling variations within the first format of the selected content, layout of the first format of the selected content, typesetting of the first format of the selected content, or a speed, clarity, prosody or intonation of a narration of the first format of the selected content.

14. The computer-implemented method of claim 7, wherein the expected difficulty of the user in comprehending the selected content item in the first format corresponds to a range of potential difficulties.

15. The computer-implemented method of claim 14, further comprising modifying the first format of the selected content item to correspond to a specific difficulty within the range of potential difficulties.

16. Non-transitory, computer-readable media including computer-executable instructions that, when executed by a processor, cause the processor to at least:

determine, for individual content items of a plurality of content items, an expected difficulty of a user in consuming a first format of the individual content item and an expected difficulty of the user in consuming a second format of the individual content item;

select a content item from the plurality of content items based at least in part on the determined difficulty of the user in consuming the first format of the selected content item and the determined difficulty of the user in consuming the second format of the selected content item; and transmit a recommendation of the selected content item to the user.

17. The non-transitory, computer-readable media of claim 16, wherein the selected content item is further selected based at least in part on at least one of preferences of the user or subject matter of the selected content item.

18. The non-transitory, computer-readable media of claim 16, wherein the computer-executable instructions further cause the processor to receive feedback of the user regarding the user's consumption of the selected content item.

19. The non-transitory, computer-readable media of claim 18, wherein the computer-executable instructions further cause the processor to modify, based at least in part on the received feedback, at least one of: the skill metrics of the user; or the difficulty metrics of the first format of the selected content item.

20. The non-transitory, computer-readable media of claim 18, wherein the feedback includes at least one of a speed at which the user consumes the selected content item, a total duration spent consuming the selected content item, an average session length of a user in consuming the selected content item, a frequency at which portions of the selected content item are repeated by the user, a set of words within the selected content item for which definitions are viewed by the user, a frequency at which definitions for words within the selected content item are viewed by the user, whether one or more portions of the selected content item are highlighted or selected by the user, whether the user completes the selected content item, or whether the user recommends the selected content item to other users.

21. The non-transitory, computer-readable media of claim 18, wherein at least a portion of the feedback is specific to the first format of the content item.

22. The computer-readable, non-transitory storage medium of claim 16, wherein expected difficulty of the user in consuming a first format of the individual content item is determined based at least in part on a plurality of difficulty metrics corresponding to the first format of the content item.

23. The computer-readable, non-transitory storage medium of claim 22, wherein expected difficulty of the user in consuming a first format of the individual content item is determined based at least in part on at least one of a linear or non-linear weighting of the plurality of difficulty metrics corresponding to the first format of the content item.

* * * * *